US 8,497,642 B2

(12) United States Patent
Yasohara et al.

(10) Patent No.: US 8,497,642 B2
(45) Date of Patent: Jul. 30, 2013

(54) MOTOR DEVICES, AND MOTOR DRIVING SYSTEM AND INTEGRATED CIRCUIT DEVICE COMPRISING THE SAME

(75) Inventors: Masahiro Yasohara, Hyogo (JP); Tomohiro Inoue, Osaka (JP); Kenji Sugiura, Osaka (JP); Toru Tazawa, Osaka (JP); Kenichi Kishimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 506 days.

(21) Appl. No.: 12/936,796

(22) PCT Filed: Apr. 6, 2009

(86) PCT No.: PCT/JP2009/001586
§ 371 (c)(1),
(2), (4) Date: Oct. 7, 2010

(87) PCT Pub. No.: WO2009/128216
PCT Pub. Date: Oct. 22, 2009

(65) Prior Publication Data
US 2011/0029137 A1 Feb. 3, 2011

(30) Foreign Application Priority Data

Apr. 15, 2008 (JP) ................. 2008-105430
Apr. 15, 2008 (JP) ................. 2008-105453

(51) Int. Cl.
*H02P 6/00* (2006.01)
(52) U.S. Cl.
USPC .................. 318/113; 318/400.01
(58) Field of Classification Search
USPC ............. 318/105–113, 700, 400.01, 400.05
See application file for complete search history.

(56) References Cited

U.S. PATENT DOCUMENTS

| 4,344,127 A * | 8/1982 | McDaniel et al. ............... 700/1 |
| 4,398,246 A * | 8/1983 | Frediani et al. ............... 715/210 |
| 6,430,634 B1 * | 8/2002 | Mito ........................... 710/100 |
| 2007/0159125 A1 | 7/2007 | Aoyama et al. |
| 2009/0079372 A1 | 3/2009 | Takeuchi |
| 2011/0031906 A1 * | 2/2011 | Yasohara et al. ............... 318/66 |

FOREIGN PATENT DOCUMENTS

| CN | 101000500 A | 7/2007 |
| EP | 0989498 A2 | 3/2000 |
| JP | 05-292098 A | 11/1993 |
| JP | 2000-073238 A | 3/2000 |
| JP | 2001-161095 A | 6/2001 |
| JP | 2002-334390 A | 11/2002 |
| JP | 2007-312447 A | 11/2007 |
| JP | 2008-022638 A | 1/2008 |
| JP | 2008-029161 A | 2/2008 |
| KR | 2005-0116654 A | 12/2005 |

OTHER PUBLICATIONS

International Search Report for International Application No. PCT/JP2009/001586, dated Jun. 30, 2009, 4 pages.

* cited by examiner

*Primary Examiner* — Bentsu Ro
(74) *Attorney, Agent, or Firm* — Brinks Hofer Gilson & Lione

(57) ABSTRACT

A motor device comprising a motor, and a drive control circuit for driving and controlling the motor, in which the drive control circuit includes a control unit for generating a control signal for controlling the rotation of the motor, a drive unit for driving the motor on the basis of the control signal, and a communication unit for making serial communications via a serial communication bus for transmitting serial data. This communication unit has an address generating function for generating and setting addresses.

31 Claims, 6 Drawing Sheets

MOTOR DEVICES, AND MOTOR DRIVING SYSTEM AND INTEGRATED CIRCUIT DEVICE COMPRISING THE SAME This application is 371 application of PCT/JP2009/001586 having an International Filing Date of Apr. 6, 2009, which claims priority to JP2008-105430 and JP2008-105453 both filed on Apr. 15, 2008, the entire contents of which are incorporated herein by reference.

TECHNICAL FIELD

The present invention relates to motor devices to be mounted on an information apparatus provided with a plurality of motor devices such as copier or printer, and a motor driving system and an integrated circuit device comprising the same, and more particularly to motor devices driven and controlled by serial communication using serial data, and a motor driving system and an integrated circuit device comprising the same.

BACKGROUND ART

In an information apparatus such as copier or printer, usually, a plurality of motors are mounted as mentioned above. In particular, such information apparatus handling documents is advanced in color display, multiple functions, and high precision, and the number of motors installed in one apparatus tends to increase. As a result, the control method of each motor is complicated, and the signal wires for controlling each motor are increased in number.

For example, in the case of a brushless DC motor coming to be used widely recently because it is easy to control the rotation, it is a general configuration to compose a motor device by integrally forming a motor main body and a motor drive control circuit, and rotate and control the motor by connecting a microcomputer and a motor drive control circuit by various signal wires. At this time, between the microcomputer and the motor drive control circuit, various signal lines are connected for start/stop, brake action/release, normal rotation/reverse rotation, rotating speed command, rotating speed monitor, rotating speed phase lock detection, control gain changeover, etc. Accordingly, when the number of motors increases, the number of required signal wires increases. As a result, the wiring space increases, which brings about various demerits, such as difficulty in downsizing of the apparatus, increase of port load and control load of main controller such as microcomputer provided at the apparatus side, and increase of the necessary system cost.

Recently, to suppress such increase in the number of signal wires, it has been widely attempted to control the objects of control by using serial communication in various devices. The serial communication in devices is realized by connecting the microcomputer and the objects of control by a serial communication bus in the devices. The serial communication bus is a data bus composed of several signal wires for transmitting serial data. At this time, in order to identify each object of control, each one is assigned with an identification number such as an address. The microcomputer sends and receives necessary data while designating the identification number, and the data can be transmitted individually to each object of control. Thus, while suppressing the increase in the number of signal wires, various data can be exchanged with a plurality of objects of control, and the microcomputer can control each object of control by using such data.

In such apparatus having a plurality of motors, similarly, the technology utilizing such serial communication has been proposed.

One of such technologies is a proposal of a driving system of a plurality of motors by connecting the serial communication buses serially and sequentially to compose a cascade connection so as to enhance the wiring efficiency, in a conventional drive control circuit of motors (see, for example, patent literature 1).

Such conventional driving system is composed as follows. That is, data for driving the plurality of motors individually is sent out as serial data via serial communication buses. The motor drive control circuits provided in individual motors are connected serially via serial communication buses. Therefore, in each motor drive control circuit, addresses for identifying each one are set by bit switches or the like. First, out of the plurality of motor drive control circuits, a first motor drive control circuit receives data. At this time, the first motor drive control circuit refers to the transmitted address via the serial communication bus, and extracts only the data for the first motor drive control circuited sent to the own address, and stores in the register. At the same time, the first motor drive control circuits transfers other data not sent to the own address to a next motor drive control circuit. Hereinafter, by processing same as in the first motor drive control circuit, the plurality of motors can be driven and controlled. In the conventional driving system, in such configuration, a simple structure is realized by a small number of wires.

Or, when controlling a plurality of motors, it is often required to control so that each motor may work cooperatively. Therefore, in a conventionally proposed driving system, a simultaneous control mode for controlling the plurality of motors simultaneously is provided, and the operation of each motor is synchronized and changed, and a cooperative working of each motor is realized (see, for example, patent literature 2).

On the other hand, in these conventional driving systems, to judge if the received data is the data sent to the own address or not, as mentioned above, each motor drive control circuit needed bit switches or the like for setting individual addresses, and when the number of motor devices increases, the number of parts such as bit switches also increases. Further, it is required to set individually in each motor drive control circuit, and the setting takes much time, or setting errors may be involved.

Hence, conventionally, another communication control device has been proposed, in which the host device can communicate with individual slave devices selectively and serially without requiring setting of individual addresses in the slave devices corresponding to the motor devices (see, for example, patent literature 3).

Such conventional communication control device is composed as follows. That is, the host device and the slave devices are sequentially connected in link state via shift pulse lines. From the host device to the slave devices, or from a slave device of upstream side to a slave device of downstream side, shift pulses are transferred sequentially according to a shift clock. In an input state of this shift pulse, when a slave device receives a shift clock signal, it is judged that a serial communication state is established. At this time, this slave device starts serial communication with the host device via a serial communication line. For example, when the shift clock is sent out twice from the host device, the shift pulse is entered only in a second slave device. As a result, only the second slave device is selected, and the serial communication is established between the host device and the second slave device.

However, in such conventional communication control device, for example, when sending same data to individual slave devices, the communicating slaves devices are selected one by one. Accordingly, it is required to repeat transmission of shift pulse from upstream side to downstream side, and to desired slave devices, and it is not suited to a system for controlling a plurality of motor devices at high speed.

Patent literature 1: Unexamined Japanese Patent Application No. 2001-161095
Patent literature 2: Unexamined Japanese Patent Application No. 2008-22638
Patent literature 3: Unexamined Japanese Patent Application No. 2007-73238

SUMMARY OF THE INVENTION

The motor device of the present invention is a motor device including a motor, and a drive control circuit for driving and controlling this motor. This drive control circuit includes a communication unit for receiving serial data sent via a serial communication bus, and referring to a set address and taking in the serial data sent to the own address, and relaying the received serial data and sending out. This communication unit has an address generating function for generating and setting addresses.

The motor driving system of the present invention includes a plurality of motor devices connected sequentially in series, and is provided with a host device for controlling the motor devices. The host device and the communication units of the plurality of motor devices are connected by serial communication buses.

The integrated circuit device of the present invention is an integrated circuit device comprising a drive control circuit for driving and controlling the motors. This drive control circuit includes a control unit for generating control signals for controlling the operation of the motors, a drive unit for driving the motors according to the control signals, and a communication unit for receiving serial data sent out through serial communication buses, referring to a set address and taking in the serial data sent to the own address, and relaying the received serial data and sending out. This communication unit has an address generating function for generating and setting addresses.

In this configuration, when a plurality of identical motor devices are disposed, and the individual communication units are sequentially connected in series via serial communication buses, it is possible to set individual addresses automatically, for example, from the motor device of the utmost upstream side to a motor device of downstream side sequentially. That is, for example, the host device gives address setting information to the communication unit at the connected utmost upstream side, and first the communication unit of the utmost upstream side sets the own address. At the same time, the communication unit at the utmost upstream side sends out, for example, information of a value adding 1 to the own address as the information relating to the set address, to a communication unit of a next stage. As a result, the communication unit of a next stage sets the value adding 1 to the address of utmost upstream side as the own address. In this manner, individually different address values are set automatically in the motor devices. In particular, in the production process, for example, the motor devices can be handled as single items because they are identical and not distinguished by addresses. Hence the specification of motor devices is unified and standardized, and the efficiency of production and component management may be enhanced, which contributes to reduction of cost of motor devices.

Thus, in the motor devices of the present invention, since addresses are generated automatically, complicated work for setting addresses is not needed, and address setting error does not occur. Moreover, since addresses are set automatically in individual motor devices, the plurality of motors can be controlled at high speed by using the addresses. In the production stage, for example, the motor devices are not identified by addresses, and the efficiency of production and component management may be enhanced.

Furthermore, the motor device of the present invention is a motor device including a motor and a drive control circuit for driving and controlling this motor. This drive control circuit includes a control unit for generating control signals for controlling the rotation of the motors, a drive unit for driving the motors according to the control signals, and a communication unit for making serial communication via serial communication buses including serial data line for transmitting serial data and serial control line for transmitting serial control signals. The communication unit judges whether or not to take in the serial data depending on the level of signal control signals.

The motor driving system of the present invention includes a plurality of motor devices and a host device for controlling the motor devices. The host device and the drive control circuits of the plurality of motor devices are connected by serial communication buses.

The motor driving system of the present invention has an individual transmission mode for transmitting serial data individually to the plurality of motor devices, and a common transmission mode for transmitting serial data to all of the plurality of motor devices.

The integrated circuit device of the present invention is an integrated circuit device comprising a drive control circuit for driving and controlling the motors. This drive control circuit includes a control unit for generating control signals for controlling the rotation of the motors, a drive unit for driving the motors according to the control signals, and a communication unit for making serial communication via serial communication buses including serial data line for transmitting serial data and serial control line for transmitting serial control signals, and judging whether or not to take in the serial data depending on the level of signal control signals.

In such configuration, individual motor devices can be selected, for example, from the host device to the communication unit of each motor device, by transmitting serial control signals via serial control signals so that the level of the serial control signal is different only in one motor device from other motor devices. On the other hand, all motor devices can be selected, from the host device to the communication unit of each motor device, by transmitting serial control signals via serial control signals so that the level of the serial control signal in each motor device may be identical.

In this way, the present invention is capable of selecting motor devices via serial control lines, and bit switches for setting addresses are not needed, and setting operation of bit switches is not necessary. Moreover, it is also possible to change over between an individual transmission mode for transmitting serial data individually to the plurality of motor devices, and a common transmission mode for transmitting serial data to all of the plurality of motor devices, and therefore when transmitting same data, and the data can be transmitted to the motor devices easily and instantly. In the production stage, for example, the motor devices are not identified by addresses, and the efficiency of production and component management may be enhanced.

DETAILED DESCRIPTION OF THE PREFERRED EMBODIMENTS

Preferred embodiments of the present invention are specifically described below by reference to the accompanying drawings.

Preferred Embodiment 1

Figure 1:
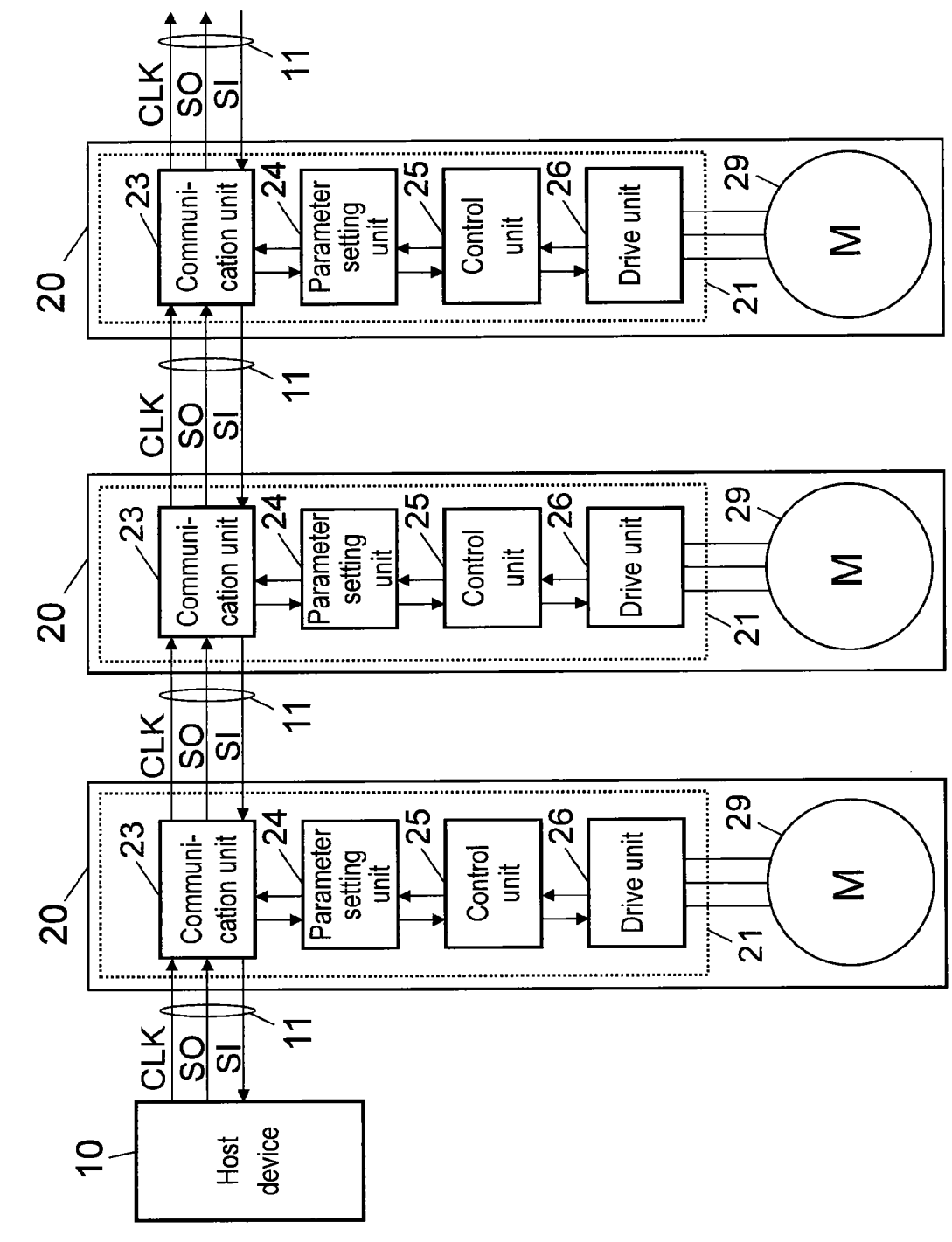
FIG. 1 is a block diagram of configuration of a motor driving system in preferred embodiment 1 of the present invention.

FIG. 1 is a block diagram of configuration of a motor driving system in preferred embodiment 1 of the present invention.

As shown in FIG. 1, this motor driving system includes a plurality of motor devices 20 each having motor 29 and drive control circuit 21 for driving and controlling motor 29, and host device 10 for controlling each one of motor devices 20. Host device 10 and drive control circuits 21 of the plurality of motor devices 20 are connected by serial communication via serial communication buses 11. As shown in FIG. 1, host device 10 controls three motor devices 20, and motor devices 20 are identical in type.

Host device 10 is installed in an apparatus comprising motor devices 20, for example, and is composed of microcomputer or DSP (digital signal processor) or the like. From such host device 10, various data for controlling the speed of motor device 20 or the like is noticed to individual motor devices 20 via serial communication buses 11. To the contrary, the data relating to the rotating speed of motors 29 is noticed from individual motor devices 20 to host device 10 via serial communication buses 11.

In individual motor devices 20, drive control circuits 21 include communication units 23 connected to serial communication buses 11, parameter setting units 24 for setting various parameters for operating motor devices 20, control units 25 for controlling the rotation and operation of motors 29, and drive units 26 for driving motors 29.

Communication units 23 are sequentially connected in series from host device 10 individually via serial communication buses 11. That is, each communication unit 23 transfers serial data from host device 10 to communication unit 23 of a later stage while relaying, and relays the serial data noticed from communication unit 23 of a later stage and transfers to host device 10. Communication units 23 thus make serial communication with host device 10 in such configuration of serial communication bus connection.

Parameter setting unit 24 acquires the data sent to the own address from the serial data transmitted to communication unit 23 via serial communication bus 11. Parameter setting unit 24 divides the acquired data into control parameters or drive parameters, and stores in a memory or other storage unit. In this manner, various parameters and other data are set in parameter setting units 24.

Control unit 25 generates a control signal for controlling the rotation or operation, for example, by using the parameters or command information set in parameter setting unit 24. Control unit 25, by using this control signal, controls the rotation or operation of motor 29, and carries out various controls and processes in motor device 20. Drive unit 26 drives motor 29 on the basis of a control signal from control unit 25.

In this preferred embodiment, serial communication bus 11 is a serial data line for transmitting serial data composed of three signal lines, for example, data output line SO as first data line, data input line SI as second data line, and clock line CLK for transmitting clock signal (merely called "clock" hereinafter). In data output line SO, serial data is transmitted from host device 10 to motor device 20. In data input line SI, serial data is transmitted from motor device 20 to host device 10. In clock line CLK, a clock synchronized with serial data is transmitted from host device 10.

In such configuration of serial communication bus 11, when host device 10 sends out serial data together with a clock, the clock and the serial data are transmitted to communication unit 23 of motor device 20 at the utmost upstream side connected directly to host device 10 by serial communication bus 11. Communication unit 23 at the utmost upstream side relays the received clock and serial data, and transfers to communication unit 23 of a next stage. In this manner, from host device 10 to communication unit 23 of the utmost upstream side at one end, to communication unit 23 of a later stage, and to communication unit 23 of the utmost downstream side at other end, sequentially, the serial data is transmitted through data output line SO via each communication unit 23. To the contrary, in the case of the data noticed from communication unit 23 of the utmost downstream side to host device 10, serial data is transmitted through data input line SI, via each communication unit 23, sequentially from communication unit 23 of the utmost downstream side, to communication unit 23 of an earlier stage, and finally to host device 10.

The motor driving system of the present preferred embodiment operates on the serial communication bus based on the clock synchronization system including the serial data line and clock line. Such serial communication bus is composed of a plurality of lines, but merely the serial data can be taken in, for example, by using the clock received from the clock line. Accordingly, as compared with the communication protocol by asynchronous communication method used among information devices, complicated communication processing procedure is not needed, and a simple configuration is realized, and the processing load of host device 10 can be reduced. Since complicated communication processing procedure is not necessary, and the response may be enhanced, and it is suited to controlling of motor device 20 of the preferred embodiment, in which high response is important. At the same time, the degree of freedom of clock frequency is high.

Figure 2:
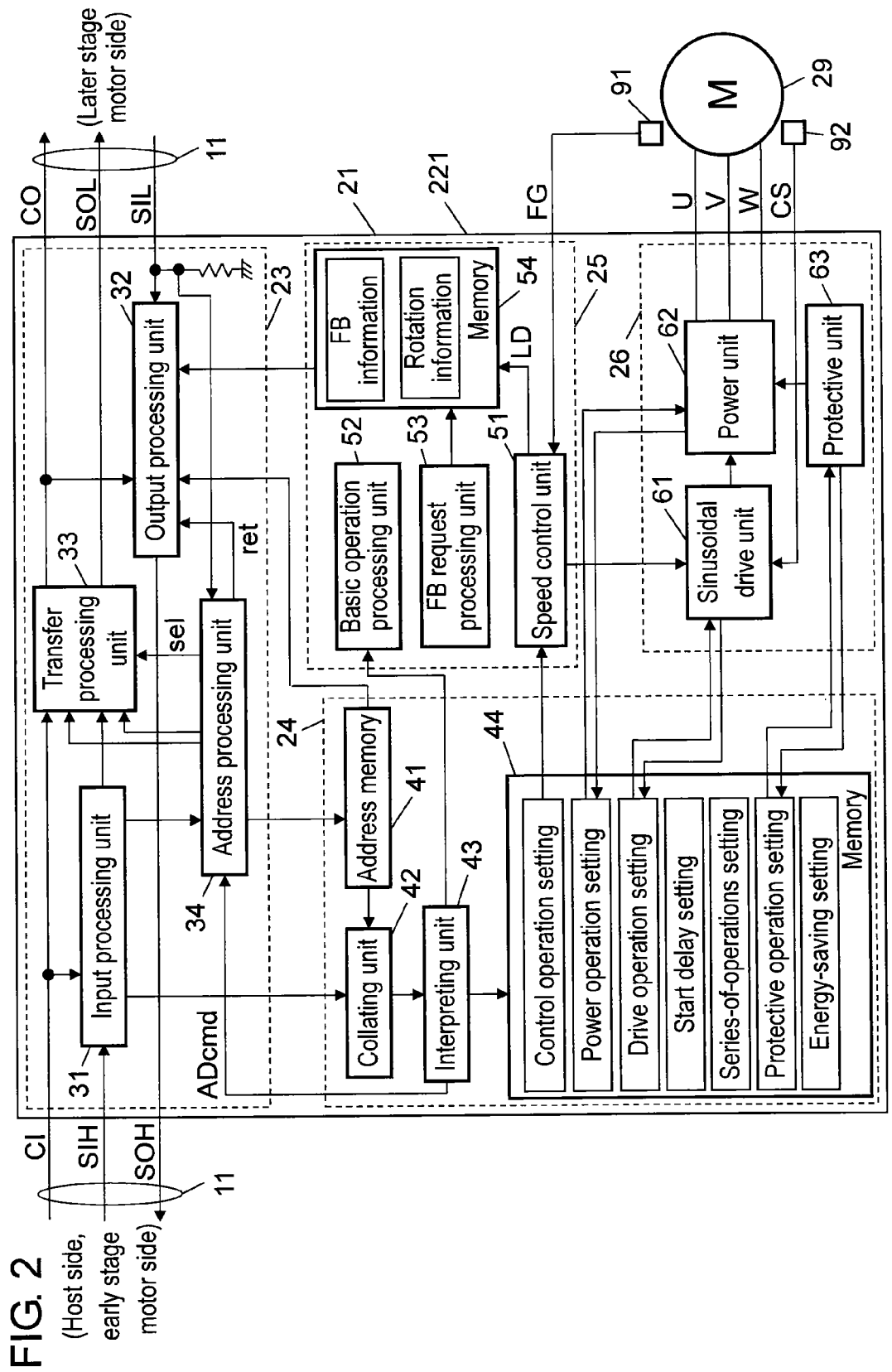
FIG. 2 is a block diagram of specific configuration of a motor device in the same motor driving system.

FIG. 2 is a block diagram of specific configuration of motor device 20 in the motor driving system of the preferred embodiment of the present invention.

In the configuration as shown in FIG. 2, drive control circuit 21 drives and controls motor 29. In this preferred embodiment, for example, motor 29 is a brushless DC motor driven sinusoidally by drive control circuit 21. By control from host device 10 via serial communication bus 11, sinusoidal driving and rectangular driving may be selected. Or, part or whole of the functions of drive control circuit 21 may be realized by one or a plurality of integrated circuit devices, and circuit elements for realizing the functions of drive control circuit 21 may be formed on a printed circuit board. In this preferred embodiment, as shown in FIG. 2, an example of realizing all functions of drive control circuit 21 by integrated circuit device 221 is presented. In motor device 20, such printed circuit boards are incorporated or integrated in motor 29.

Motor 29 has a moving element, and three phases of driving windings, U-phase, V-phase, and W-phase. In each driving winding, driving voltages U, V, and W are supplied from drive control circuit 21. Near motor 29, speed detector 91 for detecting the speed of moor 29 is disposed, together with position detector 92 for detecting the position of the moving element of motor 29. Speed detector 91 notices speed detection signal FG showing the detected speed to drive control circuit 21. Position detector 92 notices position detection signal CS showing the detected position to drive control circuit 21.

The brushless DC motor thus driven sinusoidally is often required to have a high performance, such as reduction of rotating speed fluctuations, low noise, and high efficiency in driving, in a wide range of rotating speed. To realize such requirements, it is necessary to set many control parameters and drive parameters minutely at each rotating speed. For this purpose, by controlling the brushless DC motor by using serial communication buses, the control parameters and drive parameters can be set more minutely in speed control and sinusoidal driving, and the control performance, low-noise and high-efficiency driving performance can be enhanced furthermore.

On the other hand, as shown in FIG. 2, in clock input terminal CI of drive control circuit 21, a clock is supplied through clock line CLK, form the upstream side, that is, host device 10 or motor device 20 of an earlier stage. In data input terminal SIH, serial data is supplied through data output line SO. Data output terminal SOH sends out serial data to the upstream side via data input line SI.

Clock output terminal CO of drive control circuit 21 sends out the clock from host device 10, to motor device 20 of a later stage at the downstream side, via clock line CLK. Data output terminal SOL sends out the serial data from host device 10, via data output line SO. In data input terminal SIL, from the downstream side, the serial data from motor device 20 of a later stage is supplied, via data input line SI.

Next, communication unit 23 includes input processing unit 31 for processing serial data supplied in data input terminal SIH, output processing unit 32 for processing notice of serial data to host device 10, transfer processing unit 33 for processing transfer of clock and serial data to the downstream side, and address processing unit 34 for processing generation and setting of address.

Input processing unit 31 takes in serial data supplied in data input terminal SIH, according to the clock supplied to clock input terminal CI. Input processing unit 31 converts the received serial data into parallel data, and supplies the parallel converted data as input data to parameter setting unit 24 and address processing unit 34. Input processing unit 31 further stores the received serial data into transfer processing unit 33.

In output processing unit 32, the data to be noticed to host device 10 is supplied from control unit 25. Output processing unit 32 converts the data to be noticed to host device 10 together with the address data supplied from parameter setting unit 24 into serial data, and transmits the converted serial data to host device 10 according to the clock supplied to clock input terminal CI. Output processing unit 32 also relays the serial data supplied to data input terminal SIL, and sends out from data output terminal SOH. Thus, output processing unit 32 also transfers the serial data transmitted from the downstream side to host device 10.

Meanwhile, the serial data transmitted via serial communication bus 11 includes, in addition to the ordinary data such as the data to be set as parameters, command data for commanding operation directly, or address data for specifying only one out of the plurality of motor devices 20. For example, when a reset command for returning motor device 20 to an initial state is sent out as serial data from host device 10, motor device 20 analyzes the command data, and returns itself to an initial state. When noticing data from host device 10 to specific motor device 20, the serial data sent out from host device 10 includes the data to be noticed, and the address data showing the address assigned to such motor device 20. Motor device 20 judges if the address data coincides with the own address or not, and if judged to coincide, the noticed data is taken in as the data sent to the own address. In this manner, the data is noticed to specific motor device 20. Individual motor devices 20 are automatically assigned with addresses for specifying and identifying individually.

The motor driving system of the present preferred embodiment is characterized by having such address generating function for generating addresses automatically, and to realize such address generating function, motor device 20 has address processing unit 34 and transfer processing unit 33 in communication unit 23. Since this motor driving system operates on the clock synchronization system, such address generation may be executed promptly in a simple configuration.

To address processing unit 34, address setting command ADcmd is noticed from parameter setting unit 24. When address setting command ADcmd is noticed, address processing unit 34 generates an own address on the basis of the address setting information received from serial communication bus 11. Address processing unit 34 sets the generated address as the own address, and processes to send out the information about the set address as address setting information via serial communication bus 11. Also, address processing unit 34 issues changeover signal sel to transfer processing unit 33 for sending out the address setting information to motor device 20 of a next stage.

In transfer processing unit 33, the serial data from input processing unit 31 and the clock from clock input terminal CI are supplied. At the same time, the address setting information and the clock generated by address processing unit 34 are supplied. Depending on the changeover signal sel from address processing unit 34, transfer processing unit 33 selects either the serial data or the address setting information from input processing unit 31, and similarly selects and issues the clock. That is, transfer processing unit 33 has the function of receiving changeover signal sel from address processing unit 34, and cutting off or restarting the relaying of serial data and clock from host device 10 or motor device 20 of an earlier stage. In the present preferred embodiment, an example of transfer processing unit 33 changing over the serial data and the clock is shown, but transfer processing unit 33 is not particularly specified as far as it is at least capable of cutting off the relaying of serial data, and changing over so that the address setting information may be sent out to a communication unit of a next stage via a serial data line.

Each motor device 20 has such address processing unit 34 and transfer processing unit 33, and when a command for ordering setting of an address is sent out from host device 10 to each motor device 20, address setting command ADcmd is noticed from parameter setting unit 24 to address processing unit 34. Address processing unit 34 responds to this address setting command ADcmd, and controls changeover of transfer processing unit 33 by changeover signal sel. By this changeover control, transfer processing unit 33 cuts off relaying of serial data and clock from the upstream side such as host device 10 or motor device 20 of an earlier stage, and changes over so that the address setting information may be sent out to address processing unit 34 of communication unit 23 of a next stage via serial output line SO. As a result, address processing unit 34 of each motor device 20 is individually connected so as to communicate with each other.

Afterwards, host device 10 sends out serial data including address setting information, that is, address setting information of which initial value is address #0, to motor device 20 at the utmost upstream side as one end, via serial communication bus 11. As a result, this address value #0 is noticed to address processing unit 34 at the utmost upstream side. Address processing unit 34 at the utmost upstream side receives this address value #0 as the own address #0, and generates the own address. Address processing unit 34 notices this address value #0 to parameter setting unit 24, and own address #0 is set. Further, adding a specified value to this address value #0, address processing unit 34 sends out the new value #1 as address setting information, via transfer processing unit 33 and serial communication bus 11. Later, by changeover signal sel from address processing unit 34, transfer processing unit 33 changes over so as to be capable of relaying the serial data and the clock from the upstream side.

Address processing unit 34 of motor device 20 of a next stage receives this address value #1, and sets the own address #1. Address processing unit 34, further, adding a specified value to this address value #1, sends out the new value #2 as address setting information, to motor device 20 of a next stage, via transfer processing unit 33 and serial communication bus 11. Similarly, from communication unit 23 at one end at the utmost upstream side to communication unit 23 at other end, addresses such as addresses #0, #1, #2, #3 are generated sequentially, and such addresses are set in individual motor devices 20.

The motor driving system of the present preferred embodiment has an address setting mode for setting addresses in motor devices 20, by validating such address generating function, in addition to a normal operation mode for transmitting and receiving data between host device 10 and individual motor devices 20. Besides, since this motor driving system operates on the clock synchronization method, the address generation in the address setting mode may be executed promptly in a simple configuration.

In particular, in the motor driving system of the present preferred embodiment, when such address setting mode is started, transfer processing unit 33 of each motor device 20 cuts off relaying of serial data, and changes over so that the address setting information may be sent out to communication unit 23 of a next stage via serial data line. Accordingly, the moment when the address setting mode is started, the serial communication between host device 10 and individual motor devices 20 is cut off. Sequentially from motor device 20 in which the address is established, the serial communication connection with host device 10 is reopened. In this motor driving system, because of such configuration, it is possible to prevent, for example, such inconvenience of host device 10 making communication with motor device 20 not established in address, and causing such motor device 20 to malfunction. In particular, such motor device 20 is essential in motion, such as rotating and moving action, the device main body may be destroyed if malfunction occurs. In the motor driving system of the present preferred embodiment, by configuring so as to establish communication with host device 10 sequentially from motor device 20 established in address, malfunction of motor devices 20 is prevented.

In the address setting mode of the present preferred embodiment, moreover, since the communication is cut off between host device 10 and motor device 20 not established in address, in the case of the configuration of changing over such as in transfer processing unit 33, until the address is established, at least data output terminal SOL has its output level of undetermined fixed value, and possibility of malfunction is not denied. Accordingly, instead of this configuration, for example, the following configuration may be added. That is, at least data output terminal SOL is set in released state, transmission of serial data to a next stage is cut off. Then, on the basis of the address setting information, an address is generated, and data output terminal SOL is set in closed state, and transmission of serial data is enabled, and via serial data line, the address setting information is sent out to a communication unit of a next stage. Such configuration may be also composed.

Further, in the present preferred embodiment, from motor device 20 finished in setting of the own address, address information such as the won address being set is noticed to host device 10 via data input line SI. That is, address processing unit 34 generates the own address, and after setting, notices host notice information ret including the set own address or address setting information, to output processing unit 32. In response to this notice, output processing unit 32 notices host notice information ret to host device 10. In such configuration, host device 10 can recognize the address set in each motor device 20. It is hence possible to judge whether the address generating function is executed normally or not, the precision of automatic generation of addresses may be further enhanced.

In another configuration, motor device 20 at the utmost downstream side of other end is judged to be at the utmost downstream side, and the information showing the utmost downstream side included in the host notice information ret, or the information showing completion of address generation down to the utmost downstream side is noticed to host device 10. In such configuration, host device 10 can recognize completion of processing of address generation in all motor devices 20. That is, by judging the level of the input of receiving serial data from the later stage side, it is judged that the own one is the other end, and host notice information ret including at least the judged result information may be noticed to host device 10.

In the present preferred embodiment, to judge if motor device 20 is at the utmost downstream side or not, data input terminal SIL receives a terminating resistance input connected to "L" level. Hence, since data input terminal SIL at the utmost downstream side is not connected to a next stage, the level of data input line SI at the utmost downstream side is "L" level. Thus, to judge the utmost downstream side, address processing unit 34 is connected to data input terminal SIL, and its level is judged. That is, address processing unit 34 judges the level of data input line SI, and judges that the own is other end, and notices as the address setting information including the judged result information to host device 10 via data input line SI.

Next, parameter setting unit 24 includes address memory 41 for storing addresses, collating unit 42 for collating between the address of the input data noticed from input processing unit 31, and the address stored in this address memory 41, interpreting unit 43 for interpreting the input data noticed from input processing unit 31, and setting memory 44 for storing the data noticed through serial communication bus 11.

Address memory 41 is composed of a programmable volatile memory such as RAM. That is, in such address setting mode as mentioned above, address processing unit 34 sets the value of an address in address memory 41, and the own address of motor device 20 is determined. Later, this motor driving system becomes a normal operation mode, and host device 10 transmits and receives serial data with specific motor device 20 by utilizing this address.

In particular, since this motor driving system is configured to generate addresses automatically, address setting by using bit switches is not needed. Further, by curtailing the number of parts such as bit switches, drive control circuit 21 is incorporated or integrated in motor 29, and motor device 20 is reduced in size. When drive control circuit 21 is realized by an integrated circuit device, pins for setting addresses are not needed, and the number of pins can be curtailed.

In addition, address memory 41 is a programmable volatile memory, and hence motor devices 20 to be assembled in the apparatus can be used commonly. In other words, in the production stage of motor devices 20, or in the assembling stage of motor devices 20 into the apparatus, it is not necessary to identify the addresses of motor devices 20, and hence the production and the component management can be enhanced in efficiency.

In collating unit 42, input data is supplied from input processing unit 31. The input data includes the data noticed from host device 10, and also address data. Collating unit 42 compares the address data included in the input data, and the address stored in address memory 41, and collates whether they coincide or not. When collating unit 42 judges the coincidence, the data noticed from host device 10 recognizes that the data is sent to the own address, and supplies the data included in the input data to interpreting unit 43.

Interpreting unit 43 interprets whether the data supplied from collating unit 42 is, for example, command data or the data to be set as parameter. When the data supplied from collating unit 42 is the parameter or the data for setting the operation of motor device 20, interpreting unit 43 stores the data in setting memory 44. When the data supplied from collating unit 42 is judged to be the command data for instructing address setting process to address processing unit 34, interpreting unit 43 notices address setting command ADcmd to address processing unit 34. The command data also includes, for example, basic operation command, such as start/stop of basic operation of motor device 20, brake action/release, normal rotation/reverse rotation. When interpreting unit 43 judges that such basic operation command is noticed from host device 10, such judging result is noticed to control unit 25.

In setting memory 44, data for setting various operations interpreted by interpreting unit 43 is stored. The data to be stored in setting memory 44 includes control operation setting data for setting a control operation, drive operation setting data for setting a drive operation, power unit operation setting data for setting the operation of the power unit, starting delay setting data for setting a delay time upon start, protective operation setting data for setting a protective operation, series-of-operations setting data for setting a series of operations, and energy-saving setting data for setting an energy-saving operation.

Moreover, the control operation setting data also includes data relating to control parameters such as rotating speed or corresponding control gain, and data showing the detection range of rotation information LD showing the reach at a commanded rotating speed. The drive operation setting data also includes data showing the rotating speed and corresponding advancing angle, and the waveform for driving motor 29 and method of pulse width modulation. The power unit operation setting data also includes data showing the dead time, frequency of pulse width modulation, and the switch speed of power transistor. The protective operation setting data also includes data showing valid/invalid selection of protective function, and parameter setting of operation threshold or the like. The series-of-operations setting data also includes data commanding a series of operations such as "start→rotation at specified speed→brake and slow down →stop→restart."

Next, control unit 25 includes speed control unit 51 for controlling about the rotating speed of motor 29, basic operation processing unit 52 for processing about the basic operation of motor device 20, FB request processing unit 53 for processing feedback request to host device 10 via output processing unit 32, and FB information memory 54 for storing the data for requesting feedback or rotation information LD showing the reach at a commanded rotating speed.

Speed control unit 51 takes in each data as a control parameter from the control operation setting data stored in setting memory 44. Accordingly, in speed control unit 51, control parameters for controlling the rotation such as control gain necessary when generating a speed control signal are set. Thus, when control parameters are set, speed control unit 51 generates a speed control signal for controlling the rotating speed of motor 29 on the basis of the speed command data noticed from host device 10 and speed detection signal FG noticed from speed detector 91. In this manner, speed control unit 51 supplies the generated speed control signal into drive unit 26.

Basic operation processing unit 52 controls start/stop, brake action/release, normal rotation/reverse rotation, as basic operations of motor devices 20, according to basic operation command noticed from interpreting unit 43. FB request processing unit 53 stores specified data acquired from speed control unit 51, drive unit 26, and setting memory 44 in FB information memory 54 as FB information. This FB information is the data to be noticed to host device 10, and is noticed to host device 10 via output processing unit 32 and serial communication bus 11. Further, speed control unit 51 also has a function of judging whether the speed command data noticed from host device 10 becomes a speed equal to the speed detected by speed detector 91 or not. Speed control unit 51 stores this judging result in FB information memory 54 as rotation information LD showing the reach at a commanded rotating speed. Such rotation information LD is also noticed to host device 10 as mentioned above. In particular, rotation information LD is required to be in real time for the sake of rotation control, and it is preferred to be configured to be noticed to host device 10 by priority.

Next, drive unit 26 includes sinusoidal wave drive unit 61 for generating a sinusoidal wave drive signal for sinusoidal driving of motor 29 according to the speed control signal from speed control unit 51, power unit 62 for supplying drive voltages U, V and W to each drive winding of motor 29 on the basis of the sinusoidal drive signal, and protective unit 63 for protecting power unit 62. Sinusoidal wave drive unit 61 also has a pulse width modulation (PWM) circuit for generating a sinusoidal wave drive signal. Power unit 62 also has an inverter for converting a direct-current power into an alternating-current driving power for driving motor 29.

Sinusoidal wave drive unit 61 generates a waveform signal of sinusoidal waveform in an amplitude depending on the speed control signal from speed control unit 51, and in a phase depending on the position detection signal CS from position detector 92. Further, sinusoidal wave drive unit 61 generates a drive pulse signal modulated in pulse width by the generated waveform signal. The generated drive pulse signal is supplied into power unit 62 together with sinusoidal wave drive signal.

In power unit 62, the inverter is driven by the sinusoidal wave drive signal. As a result, power unit 62 issues pulse-wave drive voltages U, V and W, depending on the sinusoidal wave drive signal. The sinusoidal wave drive signal is a signal modulated in pulse width by a waveform signal of sinusoidal waveform. Accordingly, from the principle of pulse width modulation, in average terms, drive voltages U, V and W of sinusoidal wave voltages depending on this waveform signal are supplied in the individual drive windings.

As explained herein, in this motor driving system, host device 10 and individual motor devices 20 can transmit and receive data individually by making use of addresses determined in individual motor devices 20. The addresses determined in motor devices 20 are composed so as to be set in each motor device 20 automatically by address processing unit 34 and transfer processing unit 33. Hence, address setting at the motor device side by bit switches is not needed. In the address setting mode, the serial communication connection with host device 10 is reopened sequentially from motor device 20 established in the address, and malfunction and errors can be prevented. Moreover, since the address setting information for address setting is sent out in synchronism with the clock according to the clock synchronization method, addresses are generated automatically and instantly.

In the normal operation mode, since addresses are set automatically in individual motor devices 20, host device 10 can make serial communications with individual motor devices 20 easily and promptly.

The operation of the motor driving system of the present preferred embodiment is explained below, mainly relating to the address generating function as a main feature of the present invention.

Figure 3:
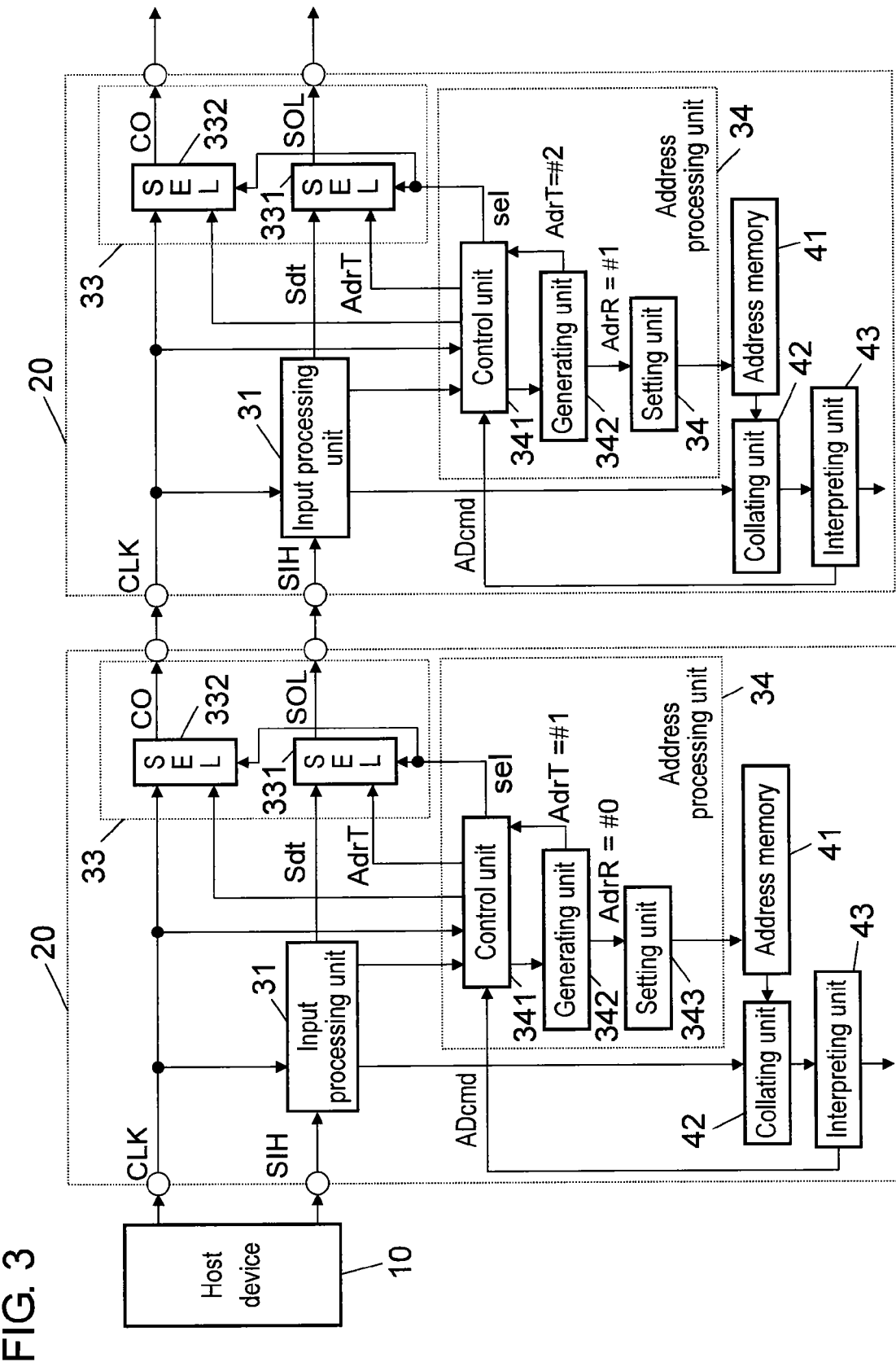
FIG. 3 is a block diagram of essential parts of the same motor driving system.

FIG. 3 is a block diagram showing essential parts of the motor driving system of the present preferred embodiment of the present invention. Referring to FIG. 3, the operation of generating and setting the addresses of the motor driving system is explained.

First, as shown in FIG. 3, address processing unit 34 includes address control unit 341 for controlling and processing in address processing unit 34, address generating unit 342 for generating addresses, and address setting unit 343 for setting addresses into address memory 41.

Address generating unit 342 generates address data AdrR showing the address to be noticed in own motor device 20, and address data AdrT showing the address to be noticed in motor device 20 of a next stage, on the basis of the address setting information noticed from address control unit 341. Address setting unit 343 sets address data AdrR noticed from address generating unit 342 in address memory 41.

Transfer processing unit 33 has selector 331 and selector 332 for changing over and issuing a signal from serial communication bus 11 and a signal from address control unit 341, depending on changeover signal sel of address control unit 341. Selector 331 changes over and issues the serial data Sdt of serial communication bus 11 from an earlier stage side, and serial data corresponding to address data AdrT issued from address control unit 341, depending on changeover signal sel. Selector 332 changes over and issues the clock of serial communication bus 11 from an earlier stage side and the clock issued from address control unit 341.

In such configuration of motor devices 20, for example, when starting up the power source of an apparatus comprising this motor driving system, or when host device 10 resets each motor device 20, the address setting mode as mentioned above is started.

First, host device 10 sends out a command for instructing setting of address to each motor device 20 via serial communication bus 11. As a result, the serial data showing this command is transmitted to input processing unit 31 of each motor device 20. The input data showing this command is noticed to interpreting unit 43 via collating unit 42. Interpreting unit 43 of each motor device 20 interprets the input data showing this command, and judges that address setting from host device 10 is commanded. On the basis of this judging, interpreting unit 43 notices address setting command ADcmd to address control unit 341 of address processing unit 34. By this notice, address control unit 341 of each motor device 20 starts processing in the address setting mode. In this manner, for controlling motor devices 20 simultaneously, it is desired to provide a simultaneous control mode for transmitting common serial data to all motor devices 20 from host device 10.

In this manner, in address setting mode, address control unit 341 of each motor device 20 changes over selector 331 and selector 332 so as to select a signal from address control unit 341 by changeover signal sel. As a result of such changeover, host device 10 is connected to be capable of communicating only with motor device 20 at the utmost upstream side via serial communication bus 11. In each motor device 20, relaying of serial data from the upstream side is cut off, and mutually adjacent address control units 341 are connected to be capable of communicating via serial communication bus 11.

Thus, after address control unit 341 sets selector 331 and selector 332, host device 10 sends out address value #0 for setting an initial value as the address setting information. At this time, host device 10 is capable of communicating only with motor device 20 at the utmost upstream side via serial communication bus 11. That is, address value #0 sent out from host device 10 is noticed only to input processing unit 31 at the utmost upstream side.

Address control unit 341 at the utmost upstream side reads in thus noticed address value #0 from input processing unit 31, and notices this address value #0 to address generating unit 342. Address generating unit 342 first sets this address value #0 as the own address value #0, and generates the own address. Further, address generating unit 342 notices this address #0 as address data AdrR to address setting unit 343. Address setting unit 343 sets this address #0 in address memory 41. In this manner, address as address #0 is set in motor device 20 at the utmost upstream side.

Moreover, address generating unit 342 generates address data AdrT for noticing to a next stage. In a specific example, address generating unit 342 adds a specified value to this address value #0, and generate new value #1 as address data AdrT. Address generating unit 342 notices address data AdrT of value #1 to address control unit 341. Afterwards, address control unit 341 supplies a clock to selector 332, and in synchronism with this clock, serial data corresponding to address data AdrT as value #1 is supplied to selector 331. As a result, as address setting information, address data AdrT as value #1 is noticed from address control unit 341 at the utmost upstream side to address control unit 341 of a next stage. Address control unit 341 at the utmost upstream side sends out address data AdrT to motor device 20 of a next stage, and changes over selector 331 and selector 332 so as to select a signal from serial communication bus 11 by changeover signal sel. After completion of address setting in motor device 20 at the utmost upstream side, communication unit 23 of this motor unit 20 notices completion of address generation to host device 10, and it may be configured to change over selector 331 and selector 332 at the same time so as to select the signal from serial communication bus 11 by changeover signal sel in each motor device 20.

To address control unit 341 of a next stage, in this manner, address data AdrT of value #1 is noticed. Hereinafter, same as in the case of motor device 20 at the utmost upstream side mentioned above, address #1 is set in address memory 41 of a next stage. Further, in a further next motor device 20, a specified value is added to this address value #1, and value #2 is noticed as address data AdrT.

As described herein, in this motor driving system, in the address setting mode, from motor device 20 at one end at the utmost upstream side to motor device 20 at other end, addresses such as addresses #0, #1, #2, #3 are sequentially generated and set while reopening the serial communication connection with host device 10. That is, for example, in address generating unit 342, the specified value to be added to the address value is supposed to be "1". In the address setting mode, therefore, when host device 10 transmits address value "0", the addresses are set as address 0, address 1, address 2, address 3, sequentially from motor device 20 closet to host device 10.

As explained herein, the motor driving system in the present preferred embodiment incorporates a plurality of motor devices 20 including motor 29 and drive control circuit 21 for driving and controlling motor 29, and also has host device 10 for controlling individual motor devices 20, in which host device 10 and drive control circuit 21 of the plurality of motor devices 20 are connected via serial communication buses 11. Further, serial communication buses 11 include serial data lines SO, SI for transmitting serial data, and clock lines CLK for transmitting clock signals. Drive control circuit 21 includes control unit 25 for generating a control signal for control the operation of motor 29, drive unit 26 for driving motor 29 on the basis of the control signal, and communication unit 23 for making serial communication with host device 10 by sequential series connection so as to relay serial data including the data for driving and controlling motor 29 from host device 10 via serial communication bus 11. Thus, this motor driving system has an address generating function for generating addresses for identifying sequentially individual communication units 23, from communication unit 23 at one end to communication unit 23 at other end, in the plurality of motor devices 20 disposed in series.

In motor device 20 of the present preferred embodiment, communication unit 23 sets the own address on the basis of address setting information received from serial communication bus 11, and sends out the information about the set address as address setting information via serial communication bus 11.

The motor driving system in the present preferred embodiment has an address setting mode for validating an address generating function. When the address setting mode is started, each communication unit 23 of motor device 20 cuts off at least relaying of serial data, and it is configured so that the address setting information may be changed over so as to be sent out to communication unit 23 of a next stage via serial data line SO.

Accordingly, in the motor driving system of the present preferred embodiment, since addresses can be generated automatically in each motor device 20, bit switches for setting addresses are not needed, and setting operation of bit switches is not necessary. Besides, in the address setting mode, relaying of serial data is cut off, and communication with motor device 20 not established in address is also cut off, and malfunction is prevented. In the normal mode, moreover, since the addresses are set automatically in individual motor devices 20, a plurality of motor devices 20 can be controlled without reduction of speed. In the present preferred embodiment, for example, in the production stage of motor devices 20, it is not necessary to identify the addresses, and the production and the component management can be enhanced in efficiency. Thus, according to the present invention, address setting at the motor device side by bit switches is not required, and serial communications with individual motor devices can be realized easily and promptly.

In the present preferred embodiment, in a structural example of communication unit 23, relaying of serial data is cut off in response to the command for instructing address setting, and alternatively, for example, relaying of serial data may be cut off on the basis of input level of serial data line.

That is, data input terminal SIH of motor device 20 at the utmost upstream side is pulled up, for example, to "H" level. Further, for example, when the power source is turned on, a signal of "L" level is issued from data output terminal SOL, and when address generation is completed, an output of "H" level is sent out. Herein, at the input level of data input terminal SIH, when the level is "H", address generation is valid, and when the level is "L", address generation is invalid. At the input level of data input terminal SIH, when "H" level continues, motor device 20 recognizes the utmost upstream side, and the initial value of address setting information is sent out from data output terminal SOL, and then "H" level is issued to notice completion of address generation. Motor device 20 of a next stage detects level change to "H" in the input level of data input terminal SIH, the address setting information from the utmost upstream side is taken in. Motor devices 20 of the following stages operate similarly.

In such configuration, when the power source is turned on, each motor device 20 refers to the input level, and judges starting of address generation. Motor device 20 at the utmost upstream side has its data input terminal SIH pulled up to "H" level, and recognizes itself that it is at the utmost upstream side. Accordingly, instead of the command for instructing setting of address, it is also possible to execute generation of addresses sequentially from motor device 20 at the utmost upstream side to the downstream side, when turning on the power source or when resetting. In this case, host device 10 is not required to command address setting, and the processing load of host device 10 can be lowered. When resetting from power failure or interruption of power source, the addresses are set again automatically, and the reliability is further enhanced.

In the present preferred embodiment, as a generating technique of address data to be included in the address setting information to be noticed to a next stage, an example of generating an address to a next stage by addition calculation of adding a specified value to the own address value is explained, but it may be realized by subtraction calculation of subtracting a specified value from the own address value. That is, any generating technique may be used as far as different values are obtained for addresses of individual motor devices according to a prescribed method of calculation.

Further, as explained herein, in the present preferred embodiment, in each motor device, the address setting information noticed from an earlier stage is used as the own address, and the own address is operated by a specific calculation, and the obtained value is sent out to a next stage as the address for a next stage. Instead, the own address may be obtained by a specific calculation of the address value included in the address setting information notice from an earlier stage, and including this own address, the address setting information may be sent out to a next stage.

In the present preferred embodiment, for example, addresses are generated sequentially from the motor device at the utmost upstream side connected to the host device toward the downstream side, but addresses may be sequentially generated from the motor device at the utmost downstream side toward the upstream side by making use of the data input line for noticing data to the host device.

Moreover, in the present preferred embodiment, the address memory is a programmable volatile memory such as RAM. Alternatively, for example, in the production stage of motor devices, the address memory may be not-write memory such as ROM, EEPROM, or flash memory, and after the motor devices are assembled into the apparatus, the address setting mode may be operated, and addresses may be set in the address memory. Same effects are obtained in such configuration, and it is not required to operate the address setting mode every time the power source of the apparatus is turned on.

In the present preferred embodiment, for example, a plurality of motor devices of a same type are disposed, but motor devices of different types may be included, and the present invention may be applied in a motor driving system having individually different motor devices.

Also in the present preferred embodiment, at least three signal wires are used, that is, data output line SO, data input line SI, and clock line CLK, but the number of signal wires is not limited, and the present invention may be applied in any configuration in which the host device and the motor devices are designed to communicate through serial data.

In the present preferred embodiment, a clock is transmitted together with serial data, but it may be applied in a serial communication method, in which a clock is always transmitted continuously, and serial data is transmitted discontinuously as required. Or, in the configuration of the present preferred embodiment, if the clock is always transmitted continuously, the selector for changing over the clocks in the transfer processing unit is not needed, and the transfer processing unit may be designed only to change over between the serial data of serial communication bus, and the serial data showing the value of the address from the address control unit.

The present preferred embodiment relates to an example of motors performing rotative operations, but it may be also applied to linear motors or other motors performing other than rotative operations.

In the present preferred embodiment, the speed control unit is shown to control the rotating speed of the motor by feedback loop control on the basis of speed command data and speed detection signal FG, but alternatively, the rotating speed of the motor may be directly driven and controlled according to the speed command data. In a water heater or an air cleaner incorporating a fan motor for driving an air conditioner or a fan moor for combustion, such control method for driving the motor directly is employed, and the present invention may be applied in the case of using a plurality of motors in such apparatuses.

Preferred Embodiment 2

Figure 4:
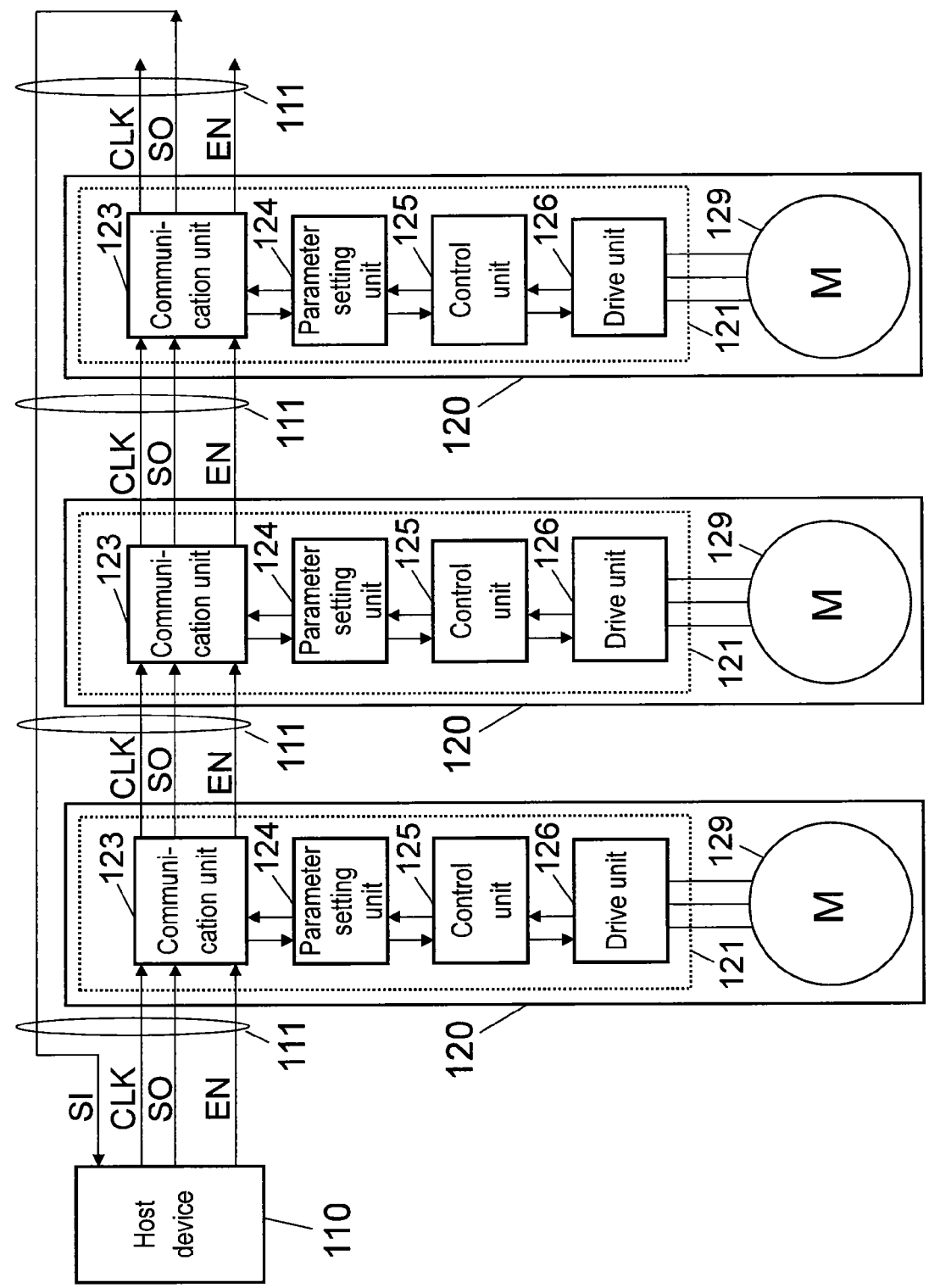
FIG. 4 is a block diagram of configuration of a motor driving system in preferred embodiment 2 of the present invention.

FIG. 4 is a block diagram of configuration of a motor driving system in preferred embodiment 2 of the present invention.

As shown in FIG. 4, this motor driving system includes a plurality of motor devices 120 each having motor 129 and drive control circuit 121 for driving and controlling motor 129, and host device 110 for controlling each one of motor devices 120. Host device 110 and drive control circuits 121 of the plurality of motor devices 120 are connected by serial communication via serial communication buses 111. As shown in FIG. 4, host device 110 controls three motor devices 120, and motor devices 120 are identical in type.

Host device 110 is installed in an apparatus comprising motor devices 120, for example, and is composed of microcomputer or DSP (digital signal processor) or the like. From such host device 110, various data for controlling the speed of motor device 120 or the like is noticed to individual motor devices 120 via serial communication buses 111. To the contrary, the data relating to the rotating speed of motors 129 is noticed from individual motor devices 120 to host device 110 via serial communication buses 111.

In individual motor devices 120, drive control circuits 121 include communication units 123 connected to serial communication buses 111, parameter setting units 124 for setting various parameters for operating motor devices 120, control units 125 for controlling the rotation of motors 129, and drive units 126 for driving motors 129.

Communication units 123 are sequentially connected in series from host device 110 individually via serial communication buses 111. Communication units 123 thus make serial communication with host device 110 in such configuration of serial communication bus connection.

Parameter setting unit 124 acquires the data sent to the own address from the serial data transmitted to communication unit 123 via serial communication bus 111. Parameter setting unit 124 divides the acquired data into control parameters or drive parameters, and stores in a memory or other storage unit. In this manner, various parameters and other data are set in parameter setting units 124.

Control unit 125 is responsible for various controls and processes in motor devices 120. For example, by using the parameters and command information set in parameter setting unit 124, control unit 125 generates a control signal for controlling the rotation, and controls the rotation or operation of motor 129 by this control signal. Drive unit 126 drives motor 129 on the basis of the control signal from control unit 125.

In this preferred embodiment, serial communication bus 111 is composed of four signal lines, data transmission line SO, data feedback line SI, clock line CLK, and serial control line EN. Data transmission line SO is a serial data line for transmitting serial data. Data transmission line SO is composed by connecting motor device 120 at the utmost upstream side from host device 110 so as to connect individual motor devices 120 sequentially in series. Further, data feedback line SI connects from motor device 120 at the utmost downstream side to host device 110, and by this connection, the serial data transmitted through data transmission line SO is fed back to host device 110. In clock line CLK, the clock synchronized with the serial data is transmitted from host device 110. In serial control line EN, serial control signals for selecting individual motor devices 120 are transmitted.

In such configuration of serial communication bus 111, when host device 110 sends out serial data together with a clock, the clock and the serial data are transmitted to communication unit 123 of motor device 120 at the utmost upstream side connected by bus to host device 110. Communication unit 123 at the utmost upstream side transfers the received clock and serial data to communication unit 123 of a next stage. In this manner, from host device 110 to communication unit 123 of the utmost upstream side at one end, to communication unit 123 of a later stage, and to communication unit 123 of the utmost downstream side at other end, sequentially, the serial data is transmitted through data transmission line SO via each communication unit 123. Further, the serial data received in motor device 120 at the utmost downstream side is transmitted to host device 110 via data feedback line SI. In this manner, the serial data line is formed in a loop form so that the serial data transmitted from host device 110 may be fed back to host device 110. Meanwhile, the data to be noticed from motor device 120 to host device 110 is noticed to host device 110 further via data feedback line SI, through data transmission line SO for connecting motor device 120 of a later stage.

Moreover, through serial control line EN of serial communication bus 111, a serial control signal is transmitted from host device 110 to each motor device 120. Serial control line EN is a bus line provided for selecting motor device 120. The detail is described below, and the motor driving system of the present preferred embodiment has two modes, that is, an individual transmission mode for transmitting serial data individually to motor devices 120, and a common transmission mode for transmitting serial data to all of motor devices 120.

In the case of individual transmission mode, through serial control line EN, a serial control signal for specifying one more device 120 is sequentially transmitted for every motor device 120. More specifically, in the case of individual transmission mode, serial control line EN is connected in a form of shift register, and the serial control signals sent out from host device 110 are sequentially transmitted to individual motor devices 120. Coinciding with the timing of transmission of serial control signal to specific motor device 120, such serial data and clock as mentioned above are transmitted to each motor device 120, and motor device 120 receiving the serial control signal takes in the serial data. In this manner, the serial data is transmitted from host device 110 to specific motor device 120.

In the case of common transmission mode, meanwhile, through serial control line EN, serial control signals for selecting all motor devices 120 are transmitted to individual motor devices. More specifically, in the case of common transmission mode, serial control lines EN are connected in series so that the signals may be transmitted commonly. Therefore, the signal level transmitted from host device 110 as serial control signal is directly transmitted to each motor device 120. At the same time, such serial data and clock are transmitted to each motor device 120. That is, all motor devices 120 directly receive this signal level, and all motor devices 120 can take in the serial data. In this way, the serial data is transmitted from host device 110 to all motor devices 120.

Figure 5:
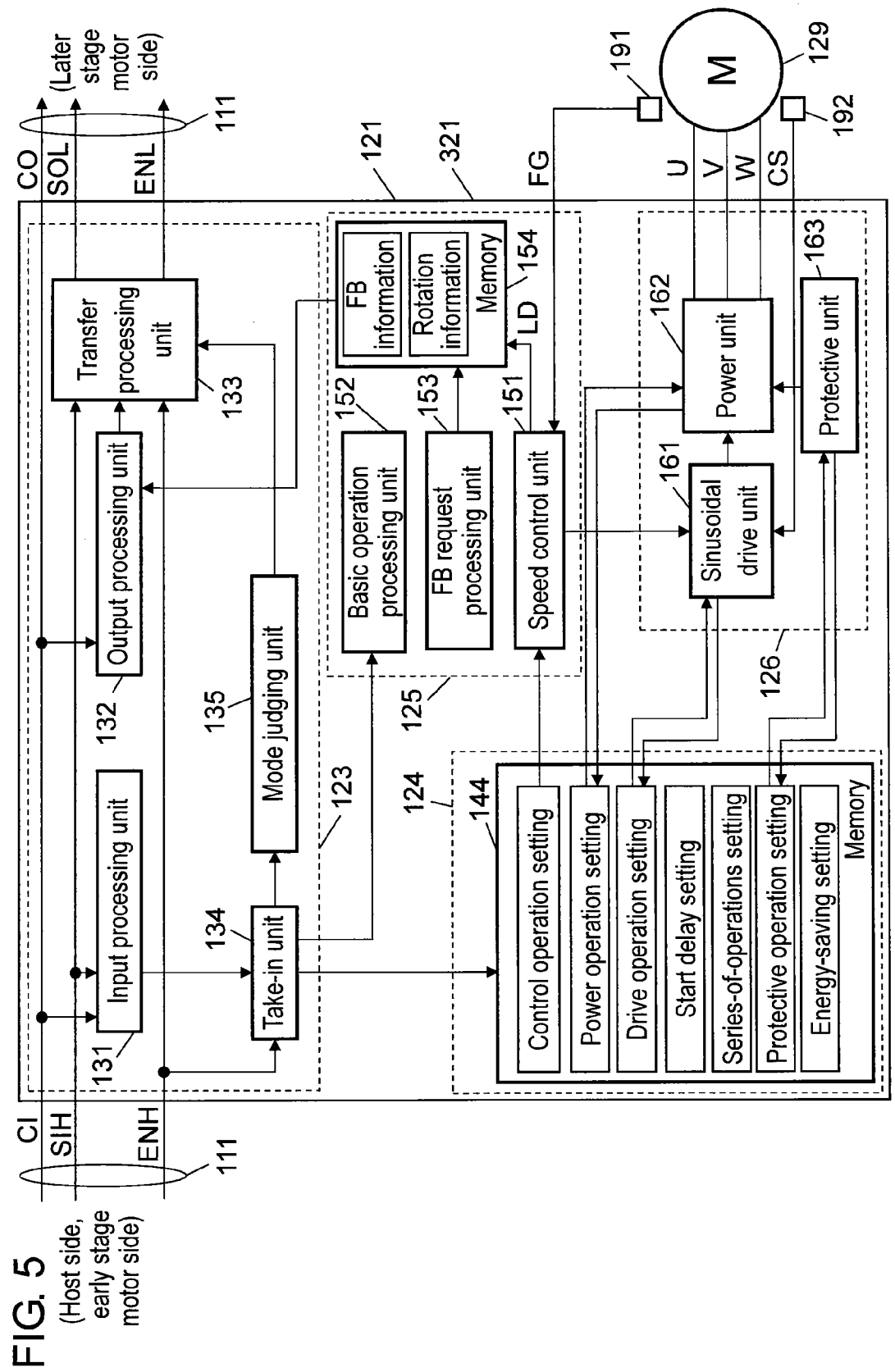
FIG. 5 is a block diagram of specific configuration of a motor device in the same motor driving system.

FIG. 5 is a block diagram showing a specific configuration of motor device 120 in the motor driving system in the preferred embodiment of the present invention.

In the configuration as shown in FIG. 5, drive control circuit 121 drives and controls motor 129. In this preferred embodiment, for example, motor 129 is a brushless DC motor driven by sinusoidal wave or rectangular wave by drive control circuit 121. Or, part or whole of the functions of drive control circuit 121 may be realized by one or a plurality of integrated circuit devices, and circuit elements for realizing the functions of drive control circuit 121 may be formed on a printed circuit board. In this preferred embodiment, as shown in FIG. 5, an example of realizing all functions of drive control circuit 121 by integrated circuit device 121 is presented. In motor device 120, such printed circuit boards are incorporated or integrated in motor 129.

Motor 129 has a moving element, and three phases of driving windings, U-phase, V-phase, and W-phase. In each driving winding, driving voltages U, V, and W are supplied from drive control circuit 121. Near motor 129, speed detector 191 for detecting the speed of moor 129 is disposed, together with position detector 192 for detecting the position of the moving element of motor 129. Speed detector 191 notices speed detection signal FG showing the detected speed to drive control circuit 121. Position detector 192 notices position detection signal CS showing the detected position to drive control circuit 121.

The brushless DC motor thus driven sinusoidally is often required to have a high performance, such as reduction of rotating speed fluctuations, low noise, and high efficiency in driving, in a wide range of rotating speed. To realize such requirements, it is necessary to set many control parameters and drive parameters minutely at each rotating speed. For this purpose, by controlling the brushless DC motor by using serial communication buses, the control parameters and drive parameters can be set more minutely in speed control and sinusoidal driving, and the control performance, low-noise and high-efficiency driving performance can be enhanced furthermore.

On the other hand, as shown in FIG. 5, in clock input terminal CI of drive control circuit 121, a clock is supplied through clock line CLK, form the upstream side, that is, host device 110 or motor device 120 of an earlier stage. In data input terminal SIH, serial data is supplied through data transmission line SO. In control signal input terminal ENH, a serial control signal is supplied through serial control line EN.

Clock output terminal CO of drive control circuit 121 issues the clock from host device 110 to motor device 120 of a later stage at the downstream side via clock line CLK. Data output terminal SOL issues the serial data from host device 110 to motor device 120 of a later stage at the downstream side via data transmission line SO. Data output terminal SOL of motor device 120 at the utmost downstream side is connected to host device 110 via data feedback line SI as mentioned above. Control signal output terminal ENL issues the serial control signal from host device 110 to motor device 120 of a later stage at the downstream side via serial control line EN.

Communication unit 123 includes input processing unit 131 for processing the serial data supplied in data input terminal SIH, output processing unit 132 for processing and noticing the serial data to host device 110, transfer processing unit 133 for processing and transferring the serial data and the serial control signal to the downstream side, take-in unit 134 for taking in the serial data supplied in input processing unit 131, and mode judging unit 135 for controlling transfer processing unit 133 according to the command data taken in by take-in unit 134.

Input processing unit 131 takes in the serial data supplied in data input terminal SIH according to the clock supplied in clock input terminal CI. Input processing unit 131 converts the take-in serial data into parallel data, and supplies the converted parallel data into take-in unit 134 as input data.

Take-in unit 134 interprets the input data supplied from input processing unit 131. Take-in unit 134 refers to the serial control signal supplied in control signal input terminal ENH, and when it judges that the serial control signal is the level for identifying itself, it takes in the supplied input data. Take-in unit 134 transfers the taken-in data to parameter setting unit 124 or control unit 125, depending to the type of the taken-in data.

The serial data to be transmitted through serial communication bus 111 includes, in addition to the ordinary data to be set as parameters, command data for commanding the operation directly, and others. For example, when a reset command for returning motor device 120 to an initial state is sent out from host device 110 as serial data, motor device 120 interprets this command data, and returns itself to an initial state. Such command data may be composed to be taken in regardless of the level of serial control signal. In particular, in this preferred embodiment, as one of the command data, a transmission mode command showing whether individual transmission mode or common transmission mode is included. When take-in unit 134 judges that this transmission mode command is transmitted from host device 110, it notices this transmission mode command to mode judging unit 135.

Mode judging unit 135 analyzes the transmission mode command noticed from take-in unit 134, and judges whether it is commanded as individual transmission mode or commanded as common transmission mode, from host device 110, and notices the judging result to transfer processing unit 133.

Transfer processing unit 133 changes over the serial data and the serial control signal to be transmitted to a next stage, according to the judging result of mode judging unit 135.

In the case of individual transmission mode, transfer processing unit 133 takes in the serial control signal supplied in control signal input terminal ENH into a shift register or the like, and the output signal from the shift register is sent out from control signal output terminal ENL. As a result, when the plurality of motor devices 120 are connected in series, serial control lines EN are connected like a shift register for delaying the serial control signals sequentially. Hence, the pulses to be sent out by host device 110 as serial control signals can be sequentially transmitted to individual motor devices 120. That is, host device 110 can thus identify a desired motor device 120.

In the case of common transmission mode, transfer processing unit 133 sends out the serial control signal supplied in control signal input terminal ENH directly from control signal output terminal ENL. Accordingly, when the plurality of motor devices 120 are connected in series, the signal level issued by host device 110 as serial control signal is directly transmitted to each motor device 120. That is, host device 110 can select in this manner so that all motor devices 120 may be common.

In output processing unit 132, the data to be noticed to host device 110 is supplied from control unit 125. Output processing unit 132 converts the data to be noticed to host device 110 to serial data. The converted serial data is supplied in transfer processing unit 133, and is further issued to data transmission line SO from data output terminal SOL. In this manner, the data to be noticed to host device 110 is transmitted to the downstream side, and is further transmitted from data output terminal SOL of motor device 120 at the utmost downstream side to host device 110 via data feedback line SI.

The motor driving system of the present preferred embodiment is characterized by the function capable of changing over serial control line EN as mentioned above, and hence individual motor devices 120 can be identified, or all motor devices 120 can be selected.

In the present motor driving system, as mentioned above, since individual motor devices 120 can be identified, address setting by bit switches is not needed. Furthermore, by curtailing the number of parts such as bit switches, motor devices 120 comprising drive control circuit 121 incorporated or integrated in motor 129 can be reduced in size. When realizing drive control circuit 121 by an integrated circuit device, pins for setting addresses are not needed, and the number of pins can be curtailed.

In this configuration, motor devices 120 to be incorporated in the apparatus can be used commonly, and, for example, in the production process of motor devices 120, or in the process of assembling motor devices 120 in the apparatus, it is not necessary to identify the addresses of motor devices 120, so that the production and the component management can be enhanced in efficiency.

Next, parameter setting unit 124 has setting memory 144 for storing the data noticed through serial communication bus 111. In setting memory 144, data for setting various operations to be stored by take-in unit 144 is stored. The data to be stored in setting memory 144 includes control operation setting data for setting control operation, dive operation setting data for setting drive operation, power unit operation setting data for setting the operation of power unit, start delay setting data for setting the delay time upon starting, protective operation setting data for setting protective operation, series-of-operations setting data for setting a series of operations, and energy-saving setting data for setting operation about energy saving.

Further, the control operation setting data includes data relating to control parameters such as the rotating speed or corresponding control gains, and data showing the detection range to rotation information LD showing the reach at a commanded rotating speed. The drive operation setting data includes the rotating speed and the corresponding advancing angle, and the data showing the waveform driving for driving motor 129 and the pulse width modulation system. The power unit operation setting data includes the data showing the dead time, the frequency of pulse width modulation, and the switch speed of the power transistor. The protective operation setting data also includes the data showing valid/invalid selection of protective function, and parameter setting of operation threshold or the like. The series-of-operations setting data also includes the data commanding a series of operations such as "start→rotation at specified speed→brake and slow down→stop→restart."

Next, control unit 125 includes speed control unit 151 for controlling about the rotating speed of motor 129, basic operation processing unit 152 for processing about the basic operation of motor device 120, FB request processing unit 153 for processing feedback request to host device 110 via output processing unit 132, and FB information memory 154 for storing the data for requesting feedback or rotation information LD showing the reach at a commanded rotating speed.

Speed control unit 151 takes in each data as a control parameter from the driving operation setting data stored in setting memory 144. Accordingly, in speed control unit 151, control parameters for controlling the rotation such as control gain necessary when generating a speed control signal are set. Thus, when control parameters are set, speed control unit 151 generates a speed control signal for controlling the rotating speed of motor 129 on the basis of the speed command data noticed from host device 110 and speed detection signal FG noticed from speed detector 191. In this manner, speed control unit 151 supplies the generated speed control signal into drive unit 126.

Basic operation processing unit 152 controls start/stop, brake action/release, normal rotation/reverse rotation, as basic operations of motor devices 120, according to basic operation command noticed from take-in unit 134. FB request processing unit 153 stores specified data acquired from speed control unit 151, drive unit 126 in FB information memory 154 as FB information. This FB information is the data to be noticed to host device 110, and is noticed to host device 110 via output processing unit 132 and data feedback line SI of serial communication bus 111. Further, speed control unit 151 also has a function of judging whether the speed command data noticed from host device 110 becomes a speed equal to the speed detected by speed detector 191 or not. Speed control unit 151 stores this judging result in FB information memory 154 as rotation information LD showing the reach at a commanded rotating speed. Such rotation information LD is also noticed to host device 110 as mentioned above.

In particular, rotation information LD is required to be in real time for the sake of rotation control, and it is preferred to be configured to be noticed to host device 110 by priority.

Next, drive unit 126 includes sinusoidal wave drive unit 161 for generating a sinusoidal wave drive signal for sinusoidal wave driving of motor 129 according to the speed control signal from speed control unit 151, power unit 162 for supplying drive voltages U, V and W to each drive winding of motor 129 on the basis of the sinusoidal wave drive signal, and protective unit 163 for protecting power unit 162. Sinusoidal wave drive unit 161 also has a pulse width modulation (PWM) circuit for generating a sinusoidal wave drive signal. Power unit 162 also has an inverter for converting a direct-current power into an alternating-current driving power for driving motor 129.

Sinusoidal wave drive unit 161 generates a waveform signal of sinusoidal waveform in an amplitude depending on the speed control signal from speed control unit 151, and in a phase depending on the position detection signal CS from position detector 192. Further, sinusoidal wave drive unit 161 generates a drive pulse signal modulated in pulse width by the generated waveform signal. The generated drive pulse signal is supplied into power unit 162 together with sinusoidal wave drive signal.

In power unit 162, the inverter is driven by the sinusoidal wave drive signal. As a result, power unit 162 issues pulse-wave drive voltages U, V and W, depending on the sinusoidal wave drive signal. The sinusoidal wave drive signal is a signal modulated in pulse width by a waveform signal of sinusoidal waveform. Accordingly, from the principle of pulse width modulation, in average terms, drive voltages U, V and W of sinusoidal wave voltages depending on this waveform signal are supplied in the individual drive windings.

The operation of the motor driving system of the present preferred embodiment is explained below, mainly relating to the changeover operation between the individual transmission mode and the common transmission mode as a main feature of the present invention.

Figure 6:
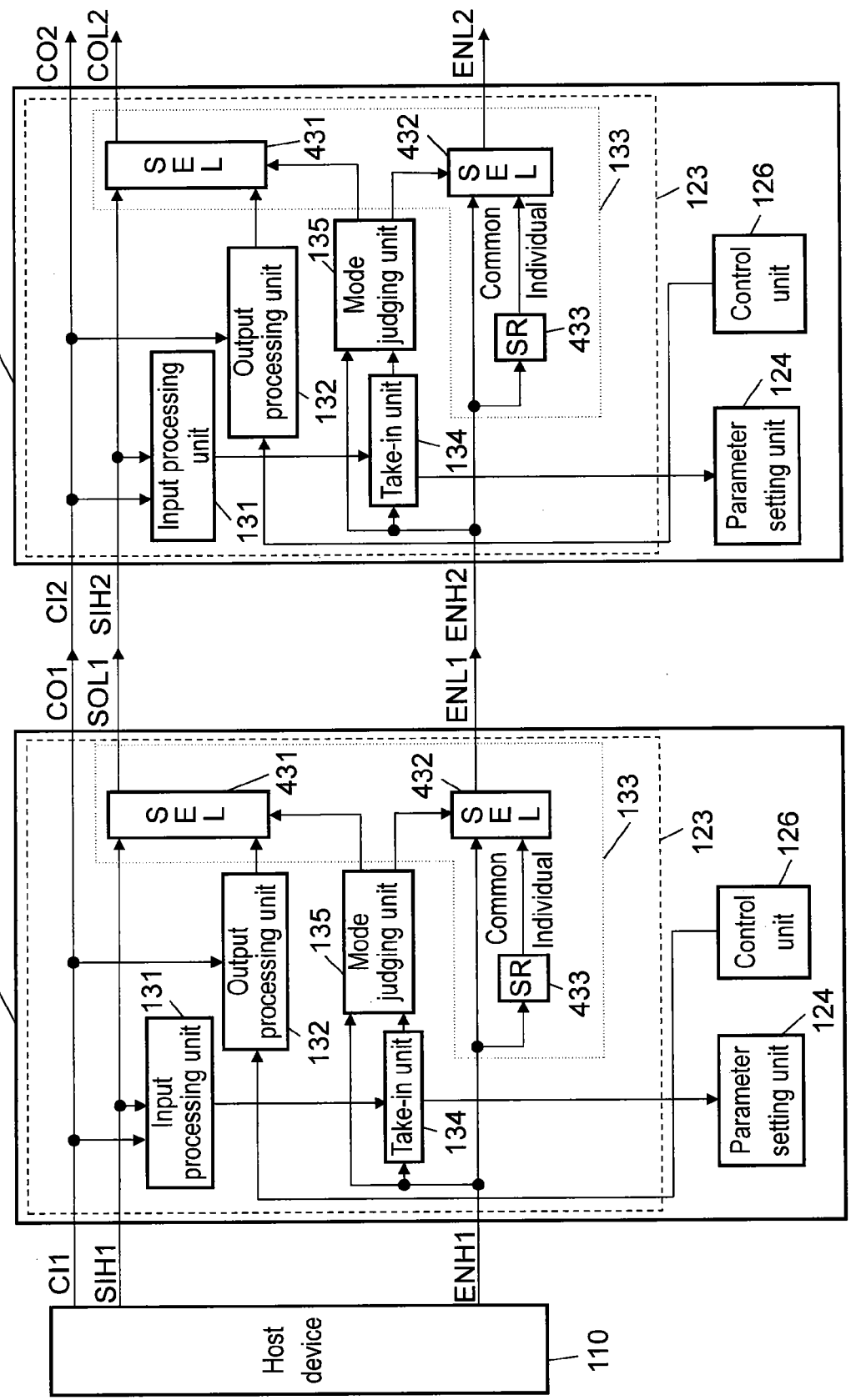
FIG. 6 is a block diagram of essential parts of the same motor driving system.

FIG. 6 is a block diagram showing essential parts of the motor driving system of the preferred embodiment of the present invention. Referring to FIG. 6, the operation in the individual transmission mode and the common transmission mode of the present motor driving system is explained.

First, as shown in FIG. 6, transfer processing unit 133 includes shift register 433 for taking in the serial control signal supplied in control signal input terminal ENH, selector 431 for changing over and issuing a signal from serial communication bus 111 and a signal from output processing unit 132, depending on the judging result of mode judging unit 135, and selector 432 for changing over and issuing a signal from control signal input terminal ENH and a signal from shift register 433, depending on the judging result of mode judging unit 135.

In such configuration, mode judging unit 135 in each drive control circuit 121 analyzes the transmission mode command and the take-in/read-out mode command noticed from take-in unit 134, and judges the command from host device 110, and notices the judging result to transfer processing circuit 133.

First, in take-in/read-out mode command, when the take-in mode is judged, the following process is executed. The take-in mode is the mode of taking in the serial data from host device 110 into motor device 120.

When the judging result of mode judging unit 135 is the take-in mode and also the individual transmission mode, transfer processing unit 133 takes in the serial control signal supplied in control signal input terminal ENH into shift register 433. Further, selector 432 selects and issues the signal from shift register 433. Selector 431 selects and issues the signal from data input terminal SIH.

As a result, in the case of individual transmission mode, shift registers 433 of each drive control circuit 121 are connected in series. That is, serial control lines EN are connected like shift registers. Accordingly, when host device 110 sends out pulse signals as serial control signals, the pulses are delayed and transmitted sequentially to each motor device 120. In this manner, host device 110 identifies desired motor devices 120 sequentially. According to the specified timing, host device 110 sends out clocks and serial data, and desired motor device 120 takes in the serial data.

When the judging result of mode judging unit 135 is the take-in mode and also the common transmission mode, selector 432 selects and issues the signal from control signal input terminal ENH. Selector 431 selects and issues the signal from data input terminal SIH. As a result, when the plurality of motor devices 120 are connected in series, the signal level issued by host device 110 as serial control signal is directly transmitted to each motor device 120. In this manner, host device 110 selects so that all motor devices 120 may be common. According to this timing, host device 110 sends out clocks and serial data, and all motor devices 120 take in the serial data.

Next, in take-in/read-out mode command, when the read-out mode is judged, the following process is executed. The read-out mode is the mode of reading out the serial data from desired motor device 120 by host device 110.

When the judging result of mode judging unit 135 is the read-out mode, host device 110 reads out the serial data from motor device 120 specified by host device 110. In the read-out mode, transfer processing unit 133 takes in the serial control signal supplied in control signal input terminal ENH into shift register 433. Further, selector 432 selects and issues the signal from shift register 433. Further, mode judging unit 135 first refers to the serial control signal, and when the serial control signal is valid, selector 431 selects the signal from output processing unit 132, and when the serial control signal is invalid, selector 431 selects the signal from data input terminal SIH, by changeover operation. Thus, when the serial control signal is transmitted to desired motor device 120, this desired motor device 120 is identified by the serial control signal, and further the serial data from output processing unit 132 is noticed to host device 110 via motor device 120 of a later stage. As a result, host device 110 can read out the data in specified motor device 120.

A specific example of take-in mode is explained below, in which serial data from host device 110 is taken into motor device 120.

For example, if take-in unit 134 is designed not to take in the data when the level of control signal input terminal ENH is "H" level, and to take in the data when it is "L" level, each communication unit 123 operates as follows.

In the case of individual transmission mode, host device 110 transmits a transmission mode command instructing the take-in mode and the individual transmission mode, and then issues serial control signals, changing the level to "H", "L", "H", to serial control line EN. These signals are delayed, and transmitted to motor devices 120 at the downstream side. For example, in control signal input terminal ENH2 of next communication unit 123 at the utmost upstream side, such serial control signal is noticed after a specified delay time. Communication unit 123 refers to such serial control signal, and recognizes that it is not selected when the serial control signal is "H" level, and recognizes that it is selected itself when the level is "L". Such serial control signals are transmitted to the downstream side. According to the timing selected by the serial control signal, serial data is issued from host device 110. As a result, the serial data is taken into communication unit 123 of motor device 120 selected by the serial control signal.

In the explanation herein, serial control signals are transmitted to the downstream side by shift registers 433 provided in communication units 123, but shift registers 433 may be replaced, for example, by the following configuration. That is, detecting the rise of serial control signal, "L" level is issued, and by counting for a specified period corresponding to one motor device 120, when counting is over, "H" level is issued. The circuit of such configuration is provided instead of shift register 433. Similarly, serial control signals are transmitted to the downstream side.

In the case of common transmission mode, host device 110 transmits a transmission mode command for instructing a common transmission mode, and then sends out a serial control signal of "L" level to serial control line EN. As a result, control signal input terminals ENH of all motor devices 120 become "L" level. It is hence recognized that take-in units 134 of all motor devices 120 should take in the transmitted serial data. Afterwards, when serial data and clocks are transmitted from host device 110 to motor devices 120, the data of the transmitted serial data is taken in by each take-in unit 134, and common data can be set in all motor devices 120 by one operation.

As explained herein, the motor driving system in the present preferred embodiment incorporates a plurality of motor devices 120 including motor 129 and drive control circuit 121 for driving and controlling motor 129, and also has host device 110 for controlling the each motor device, in which host device 110 and drive control circuit 121 of the plurality of motor devices 120 are connected via serial communication buses 111. Further, serial communication buses 111 include serial data lines for transmitting serial data, and serial control lines for transmitting serial control signals. Drive control circuit 121 includes control unit 125 for generating a control signal for controlling the rotation of motor 129, drive unit 126 for driving motor 129 on the basis of the control signal, and communication unit 123 for making serial communication with host device 110 by sequential series connection from host device 110 via serial communication bus 111. Communication unit 123 judges whether or not to take in the serial data depending on the level of serial control signal.

Hence, for example, from host device 110 to communication unit 123 of each motor device 120, a serial control signal is transmitted via a serial control signal so that the level of the serial control signal is different only in one motor device 120 from other motor devices 120, and individual motor devices 120 may be selected. On the other hand, from host device 110 to communication unit 123 of each motor device 120, a serial control signal is transmitted via a serial control signal so that the level of the serial control signal is same in all motor devices 120, and all motor devices 120 may be selected.

Accordingly, in the motor driving system of the present preferred embodiment, bit switches for setting addresses are not needed, and setting operation of bit switches is not necessary. Besides, the individual transmission mode for transmitting serial data individually to the plurality of motor devices, and the common transmission mode for transmitting serial data to all of the plurality of motor devices can be easily changed over, and when transmitting same data, the data can be transmitted to individual motor devices easily and promptly.

In each motor device, in the production stage, for example, address identification is not needed, and the production and component management can be enhanced in efficiency. Thus, according to the present invention, address setting at the motor device side by bit switches is not required, and when transmitting same data, serial communications with individual motor devices can be realized easily and promptly.

In the present preferred embodiment, an example of disposing a plurality of motor devices of a same kind is explained, but motor devices of different kinds may be included, and the present invention may be applied to a motor driving system incorporating individually different motor devices.

In the present preferred embodiment, four signal wires are used, but the number of signal wires is not specified, and the present invention may be applied in any other configuration in which the host device and the each motor device communicate by serial data.

In the present preferred embodiment, the serial data received in motor device 120 at the utmost downstream side is fed back to host device 110 via data feedback line SI, but another feedback line may be added for feeding back also the serial control signal received in motor device 120 at the utmost downstream side to host device 110. In such configuration, host device 110 can recognize the completion of serial data transmission in the individual transmission mode.

In the present preferred embodiment, a clock is transmitted together with serial data, but it may be applied in a serial communication method, in which a clock is always transmitted continuously, and serial data is transmitted discontinuously as required.

The present preferred embodiment relates to an example of motors performing rotative operations, but it may be also applied to linear motors or other motors performing other than rotative operations.

In the present preferred embodiment, the speed control unit is shown to control the rotating speed of the motor by feedback loop control on the basis of speed command data and speed detection signal FG, but alternatively, the rotating speed of the motor may be directly driven and controlled according to the speed command data. In a water heater or an air cleaner incorporating a fan motor for driving an air conditioner or a fan moor for combustion, such control method for driving the motor directly is employed, and the present invention may be applied in the case of using a plurality of motors in such apparatuses.

INDUSTRIAL APPLICABILITY

The motor device and the motor driving system of the present invention do not require address setting at the motor device side, and are capable of making serial communications with motor devices easily and promptly, and by using such serial communications, many control parameters and drive parameters may be set carefully and minutes at each rotating speed. It is hence preferable in a motor driving system or a motor device used in applications where a higher performance is required in a wider range of rotating speed, such as a printer, a copier, a hard disk, an optical media device and other information device. It is also preferable in a water heater or an air cleaner incorporating a fan motor for driving an air conditioner or a fan moor for combustion.

What is claimed is:
1. A motor device, comprising:
a motor; and
a drive control circuit for driving and controlling the motor, wherein the drive control circuit includes
a communication unit for receiving serial data sent via a serial communication bus, and referring to a set address and taking in the serial data sent to an own address, and relaying the received serial data and sending out, and wherein the communication unit has an address generating function for generating and setting the address.

2. The motor device according to claim 1, wherein the serial communication bus includes a serial data line for transmitting serial data, and a clock line for transmitting clock signals.

3. The motor device according to claim 2, wherein the communication unit generates an address on the basis of address setting information received from the serial communication bus, sets the generated address as an own address, and sends out the information about the set address as the address setting information via the serial communication bus.

4. The motor device according to claim 3, wherein the communication unit cuts off relaying of the serial data until completion of generating and setting the address.

5. The motor device according to claim 4, wherein the communication unit cuts off relaying of the serial data in response to a command for generating the own address.

6. The motor device according to claim 5, wherein the communication unit, after cutting off relaying of the serial data, changes over so that the address setting information may be sent out via the serial data line, and then changes over to resume relaying of the serial data.

7. The motor device according to claim 6, wherein the communication unit sets the address indicated by the address setting information received from the serial communication bus as the own address, calculates the value of the own address with a specified operation, and sends out the obtained value as the address setting information via the serial communication bus.

8. The motor device according to claim 6, wherein the communication unit sets the value calculated by a specified operation on the value of the address indicated by the address setting information received from the serial communication bus as the own address, and sends out the value set as the own address as the address setting information via the serial communication bus.

9. The motor device according to claim 4, wherein the communication unit cuts off relaying of the serial data on the basis of an input level of a serial data line.

10. The motor device according to claim 9, wherein the communication unit, after cutting off relaying of the serial data, changes over so that the address setting information may be sent out via the serial data line, and then changes over to resume relaying of the serial data.

11. The motor device according to claim 10, wherein the communication unit sets the address indicated by the address setting information received from the serial communication bus as the own address, calculates the value of the own address with a specified operation, and sends out the obtained value as the address setting information via the serial communication bus.

12. The motor device according to claim 10, wherein the communication unit sets the value calculated by a specified operation on the value of the address indicated by the address setting information received from the serial communication bus as the own address, and sends out the value set as the own address as the address setting information via the serial communication bus.

13. The motor device according to claim 3, wherein the serial data line is composed of a first data line for receiving the serial data from an earlier stage side and sending out to a later stage side, and a second data line for receiving the serial data from a later stage side, sending out to an earlier stage side, and sending out also the own serial data to an earlier stage side.

14. The motor device according to claim 13, wherein the communication unit generates an address on the basis of the address setting information received from an earlier stage side via the first data line, and sends out the generated address information to the second data line.

15. The motor device according to claim 1, wherein the motor is a brushless DC motor having a moving element, and three phases of driving windings, being driven at least sinusoidally.

16. A motor driving system comprising a plurality of motor devices as set forth in claim 1, being disposed sequentially in series, and a host device for controlling the motor devices, wherein the host device and the communication units of the plurality of motor devices are connected by the serial communication buses.

17. The motor driving system according to claim 16, wherein the individual communication units generate addresses for identifying individually sequentially, from the communication unit at one end toward the communication unit at other end, in the plurality of motor devices disposed in series.

18. The motor driving system according to claim 17, wherein first address setting information is sent out from the host device to the communication unit at one end connected directly to the host device by the serial communication bus, and to the communication unit at other end, the individual communication units generates the addresses sequentially.

19. The motor driving system according to claim 18, wherein an address setting mode for validating the address generating function is provided, and when the address setting mode is started, the individual communication units cut off relaying of at least the serial data.

20. The motor driving system according to claim 19, wherein the individual communication units notice a host notice information including the values of the generated addresses to the host device.

21. The motor driving system according to claim 19, wherein the communication unit at other end judges the level of the input of receiving the serial data from a later stage side, and judges itself to be at other end, and notices the information at least including the judging result as host notice information to the host device.

22. A motor device, comprising:
a motor; and
a drive control circuit for driving and controlling the motor, wherein the drive control circuit includes
a control unit for generating a control signal for controlling the rotation of the motor,
a drive unit for driving the motor on the basis of the control signal, and
a communication unit for making serial communications via a serial communication bus including a serial data line for transmitting serial data, and a serial control line for transmitting serial control signals, and
wherein the communication unit judges whether to take in the serial data or not, depending on the level of a serial control signal.

23. The motor device according to claim 22, wherein it is changed over between a state in which the serial control lines are connected like a shift registers for transmitting the signals sequentially in each motor device, and a state in which the serial control lines are connected in of series for transmitting the signals commonly.

24. The motor device according to claim 22, wherein the motor is a brushless DC motor having a moving element, and three phases of driving windings, being driven at least sinusoidally by the drive unit.

25. A motor driving system comprising a plurality of motor devices as set forth in claim 22, being disposed sequentially in series, and a host device for controlling the motor devices, wherein the host device and the communication units of the plurality of motor devices are connected by the serial communication buses.

26. The motor driving system according to claim 25, further comprising an individual transmission mode for transmitting serial data individually to the plurality of motor devices, and a common transmission mode for transmitting serial data to all of the plurality of motor devices.

27. The motor driving system according to claim 26, wherein the serial control signals are transmitted sequentially from the communication unit of the motor device connected to the host device toward the opposite side.

28. The motor driving system according to claim 26, wherein in the individual transmission mode, the serial control lines are connected like shift registers so that the signals may be transmitted sequentially to each motor device, and in the common transmission mode, the serial control lines are connected in series so that the signals may be transmitted commonly.

29. The motor driving system according to claim 28, wherein the serial control signals are transmitted from the communication unit of the motor device connected to the host device sequentially toward the opposite side.

30. An integrated circuit device, comprising:
a drive control circuit for driving and controlling a motor, wherein the drive control circuit includes
  a control unit for generating a control signal for controlling operation of the motor,
  a drive unit for driving the motor on the basis of the control signal, and
  a communication unit for receiving serial data sent via a serial communication bus, and referring to a set address and taking in the serial data sent to an own address, and relaying the received serial data and sending out, and
wherein the communication unit has an address generating function for generating and setting the address.

31. An integrated circuit device, comprising;
a drive control circuit for driving and controlling a motor, wherein the drive control circuit includes
  a control unit for generating a control signal for controlling the rotation of the motor,
  a drive unit for driving the motor on the basis of the control signal, and
a communication unit for making serial communications via a serial communication bus including a serial data line for transmitting serial data, and a serial control line for transmitting serial control signals, and judging whether to take in the serial data or not depending on a level of the serial control signal.

* * * * *